(12) United States Patent
Widera et al.

(10) Patent No.: US 7,542,537 B2
(45) Date of Patent: Jun. 2, 2009

(54) METHOD FOR TEMPORAL SYNCHRONISATION OF AT LEAST TWO MEASURING COMPUTERS COOPERATING OVER A TELECOMMUNICATION NETWORK SUCH AS INTERNET, INTRANET OR SIMILAR

(75) Inventors: Ralf Widera, Griesheim (DE);
Cornelius Heidemann, Darmstadt (DE);
Joachim Mende, Griesheim (DE);
Heinrich Doerken, Darmstadt (DE)

(73) Assignee: Deutsche Telekom AG, Bonn (DE)

( * ) Notice: Subject to any disclaimer, the term of this patent is extended or adjusted under 35 U.S.C. 154(b) by 452 days.

(21) Appl. No.: 10/507,097

(22) PCT Filed: Feb. 21, 2003

(86) PCT No.: PCT/DE03/00540

§ 371 (c)(1),
(2), (4) Date: Feb. 11, 2005

(87) PCT Pub. No.: WO03/077086

PCT Pub. Date: Sep. 18, 2003

(65) Prior Publication Data

US 2005/0198240 A1   Sep. 8, 2005

(30) Foreign Application Priority Data

Mar. 12, 2002   (DE) .................. 102 10 711

(51) Int. Cl.
*H04L 7/00* (2006.01)
*G06F 15/173* (2006.01)

(52) U.S. Cl. ................. 375/356; 709/224; 370/252
(58) Field of Classification Search ................. 375/356
See application file for complete search history.

(56) References Cited

U.S. PATENT DOCUMENTS

| | | | |
|---|---|---|---|
| 5,682,408 A | 10/1997 | Tanonaka | 375/354 |
| 5,694,537 A | 12/1997 | Montenegro et al. | 395/182 |
| 5,812,749 A | 9/1998 | Fernandez et al. | 395/182.02 |
| 6,094,672 A | 7/2000 | Willie et al. | 709/202 |
| 6,157,957 A * | 12/2000 | Berthaud | 709/248 |

(Continued)

FOREIGN PATENT DOCUMENTS

DE   10046240   3/2002

(Continued)

OTHER PUBLICATIONS

David L. Mills, "Internet Time Synchronization: The Network Time Protocol", IEEE Transaction on Communications, vol. 39, No. 10, Oct. 1991, pp. 1482-1493.

(Continued)

*Primary Examiner*—Shuwang Liu
*Assistant Examiner*—David Huang
(74) *Attorney, Agent, or Firm*—Darby & Darby

(57) ABSTRACT

A method for time synchronization of a number of measuring computers cooperating over a telecommunications network includes providing a number of time sources associated with one of the measuring computers. Each of the time sources has a different accuracy and can provide a time stamp. Using the first measuring computer, one of the time sources is selected as a function of the accuracy of the time source.

33 Claims, 1 Drawing Sheet

U.S. PATENT DOCUMENTS

| | | | |
|---|---|---|---|
| 6,236,623 B1 * | 5/2001 | Read et al. | 368/46 |
| 6,256,507 B1 * | 7/2001 | Lemieux | 455/502 |
| 6,311,283 B1 | 10/2001 | Gonzalez | 713/400 |
| 2001/0023464 A1 | 9/2001 | Deck et al. | 710/105 |
| 2004/0024550 A1 | 2/2004 | Doerken et al. | 702/79 |

FOREIGN PATENT DOCUMENTS

| | | |
|---|---|---|
| DE | 10128927 | 1/2003 |
| EP | 1143312 | 10/2001 |
| JP | 10124465 | 5/1998 |
| WO | 9705549 | 2/1997 |

OTHER PUBLICATIONS

David L. Mills, "Adaptive Hybrid Clock Discipline Algorithm for the Network Time Protocol", IEEE/ACM Transactions on Networking, vol. 6, No. 5, Oct. 1998, pp. 505-514.

* cited by examiner

METHOD FOR TEMPORAL SYNCHRONISATION OF AT LEAST TWO MEASURING COMPUTERS COOPERATING OVER A TELECOMMUNICATION NETWORK SUCH AS INTERNET, INTRANET OR SIMILAR

The present invention relates to a method for time synchronization in at least two measuring computers cooperating over a telecommunications network such as Internet, intranet or similar, using selection of a time source, and to a device for carrying out the method.

BACKGROUND

A measuring system for measuring the Internet Protocol (IP) performance parameters, such as one-way delay, IP delay variations, and packet losses, in IP networks is known from non-prepublished German Patent Application DE 100 46 240.5. The subject matter of non-prepublished German Patent Application DE 101 28 927.8 is a method that allows time stamps to be generated in the underlying measuring system even when access to a reference clock is blocked for a short time.

The measuring system underlying these patent applications is a distributed measuring system, i.e., the individual system components are spatially distributed and interconnected via a telecommunications network. This measuring system includes at least two measuring computers, a database in which the measurement results and the configuration of the measuring system are stored, a control computer controlling the measuring computers for determining the measurement result, as well as various graphical user interfaces, in particular for configuring the measuring system and visualizing the obtained measurement results.

In order to carry out the measuring method, a unidirectional measurement path is established between at least two measuring computers. On this measurement path, measurement packets are sent from a first measuring computer to a second measuring computer with a configurable distribution in time.

In the process, the departure of the measurement packet from the first measuring computer is recorded; i.e., a first time stamp is generated. This first time stamp is transmitted to the second measuring computer together with the measurement packet and other data, such as sequence numbers. The second measuring computer records the arrival of the measurement packet and generates a second time stamp. To allow the one-way delay resulting from the difference of the two time stamps to be determined with sufficient accuracy, the time stamps generated by the measuring computers need to be time-synchronized with sufficient accuracy.

A technical implementation is, for example, the generation of the time stamps using a satellite system, such as GPS (Global Positioning System), acting as a time source. In the process, the measuring computers continuously receive, via a GPS antenna, the UTC time (Universal Coordinated Time) transmitted by a plurality of satellites. Using a GPS map integrated into the measuring computers, it is thus possible to generate time stamps with an error of +/−0.5 µs.

The GPS satellite system used as a timer, and the further components GPS antenna and GPS map are together more simply referred to as GPS clock hereinafter.

The measurement results are retrieved by the control computer from the second measuring computer as measured data and stored in a database, where they are made available for visualization. The measurement results and the system status may optionally be displayed via an offline display or an online display. In this context, "offline display" means that the display of the measurement results must be initiated manually via a WWW browser while in the case of the online display, the display is automatically updated and displayed at a certain time interval.

The above-mentioned graphical user interfaces are used for this purpose.

The configuration of the measuring system is also carried out using the aforementioned graphical user interface. To this end, the user enters information about the type and course of the measurement. The information entered is stored in a database; the control computer reads this data from the database, configures the measuring computers accordingly, and starts or stops the measurement connections according to this data.

As mentioned earlier, it is of outstanding importance for the quality of the obtained measurement result that the first and second time stamps be time-synchronized with sufficient accuracy. Should the first and second time stamps not be synchronized with sufficient accuracy, the measured one-way delay as the difference of the two time stamps can consequently not be exactly determined either.

SUMMARY OF THE INVENTION

In this context, it turns out to be particularly disadvantageous that when the GPS clock fails, for example, due to problems with the GPS antenna, contact problems in the antenna feeder, or the like, no measurement can be performed because of the lack of the time stamp.

It is an object of the present invention to provide a method for time synchronization of at least two measuring computers cooperating over a telecommunications network such as Internet, intranet or similar, in such a manner that a measurement can be performed even when the GPS clock fails, while avoiding the above-mentioned disadvantages.

The present invention provides a method for time synchronization of a plurality of measuring computers cooperating over a telecommunications network. The method includes:
  providing a plurality of first time sources associated with a first measuring computer, each of the first time sources having a different respective accuracy and configured to provide a first time stamp; and
  selecting, using the first measuring computer, a third time source of the plurality of first time sources as a function of an accuracy of the third time source.

The present invention also provides a time synchronization device. The time synchronization device includes: a first measuring computer; a second measuring computer cooperating with the first measuring computer over a telecommunications network; and a plurality of first time sources associated with a first measuring computer, each of the first time sources having a different respective accuracy and configured to provide a first time stamp. The first computer is configured to select a third time source of the plurality of first time sources as a function of an accuracy of the third time source.

The present invention includes the discovery that by providing a plurality of independent time sources at the individual measuring computers, the probability that no time source can be read is minimized, thus ensuring that a time stamp is read out.

Therefore, in accordance with the present invention, several time sources of different accuracy are made available to each measuring computer for reading the time stamp from a time source. The selection of the time source to be used for generating the required time stamp is made by the measuring computer as a function of the accuracy of the available time sources. This redundancy of time sources has the advantage that the generation or the readout of a time stamp from a time source is ensured in a simple manner. The risk of a measurement failure due to the lack of a time stamp is minimized by ensuring that the time stamp is read from a second time source in the case that a first time source fails.

To obtain the best possible measurement results, the measuring computer first selects the time source of the highest accuracy for reading the time stamp from a time source.

If the measuring computer is unable to read a time source of higher accuracy, it automatically selects a time source of the next best accuracy. This hierarchical method with regard to the selection of the time source allows the best possible measurement result to be obtained under the given circumstances, i.e., the failure of a more accurate time source.

In accordance with one embodiment of the present invention, signals of a satellite system, such as GPS (Global Positioning System), are used as the time source of the highest accuracy.

The signals of the satellite system are received by local GPS receivers integrated into the measuring computers. The GPS receiver, which includes, inter alia, a GPS map and a GPS antenna as components, will be more simply referred to as "GPS clock" hereinafter. Using a GPS clock as the time source of the highest accuracy, a tolerance of +/−0.5 μs is ensured for the readout of the time stamp in a simple manner.

Preferably, the measuring computers each have local clocks that are continuously synchronized to the local GPS receivers via NTP (Network Time Protocol)—internal synchronization. Internal synchronization via NTP provides a simple way to generate a second, highly accurate time source.

These internally synchronized clocks of the measuring computers are used as the time sources of the second highest accuracy.

In one embodiment of the present invention, when no signal of the satellite system is present at the local GPS receiver of a first measuring computer, the local clock of the first measuring computer is synchronized via NTP (Network Time Protocol) to the local clock of at least one predetermined second measuring computer after a predetermined time interval—external synchronization. This has the advantage that when the GPS clock at a measuring computer fails for a longer period of time, which accordingly involves a failure of the internally synchronized time source of the second highest accuracy, a third time source is generated.

According to the present invention, the time interval after which the local clock of the first measuring computer is externally synchronized to the local clock of a second measuring computer is freely adjustable.

These externally synchronized local clocks of the measuring computers are used as the time sources of the third highest accuracy. Unsynchronized local clocks of the measuring computers are accordingly referred to as time sources of the fourth highest order.

To ensure high accuracy in the external synchronization of a local clock of a measuring computer, the external synchronization of the local clock of the measuring computer is done only with time sources of the second highest accuracy.

Interpretation of the accuracy of the generated time stamp is made possible primarily in that when the local clock of a measuring computer is internally or externally synchronized, the respective synchronization type is stored as well as the synchronization accuracy obtained in the process.

According to one embodiment of the present invention, measurement packets, in particular UDP measurement packets (User Datagram Protocol), are transmitted between the measuring computers for delay measurement. UDP is a connectionless Internet transport protocol that is based on the basic protocol for data transmission in the Internet (IP). Preferably, the one measuring computer is used as a sender while the other measuring computer acts as a receiver.

The sending measuring computer records the time of departure—send time stamp—of the outgoing measurement packet. Other data associated with the send time stamp is generated and transmitted to the receiving measuring computer along with the measurement packet and, possibly, further data, such as the sequence number, or the like.

Preferably, the data associated with the send time stamp relates to information about the used time source from which the send time stamp was read, the type of synchronization, the accuracy of the synchronization, as well as an estimate of the accuracy of the generated send time stamp.

Correspondingly, the receiving measuring computer records the time of arrival of the measurement packet—receive time stamp—as the second data, and generates other data associated with the receive time stamp.

Preferably, the data associated with the receive time stamp in turn relates to information about the time source used for reading the receive time stamp, the type of synchronization, the accuracy of the synchronization, as well as an estimate of the accuracy of the generated receive time stamp.

Preferably, the first data and the second data are assigned to a predetermined evaluation, which may result in that these first and second data are not further considered when quality falls below a predetermined level.

The measurement result is determined from the still existing first data and the second data.

BRIEF DESCRIPTION OF THE DRAWING

Further advantages, features and possible uses of the present invention for time synchronization in at least two measuring computers cooperating over a telecommunications network such as Internet, intranet or similar, will become apparent from the following description in conjunction with the exemplary embodiment shown in the drawing.

In the Drawing.

DETAILED DESCRIPTION

Figure 1:
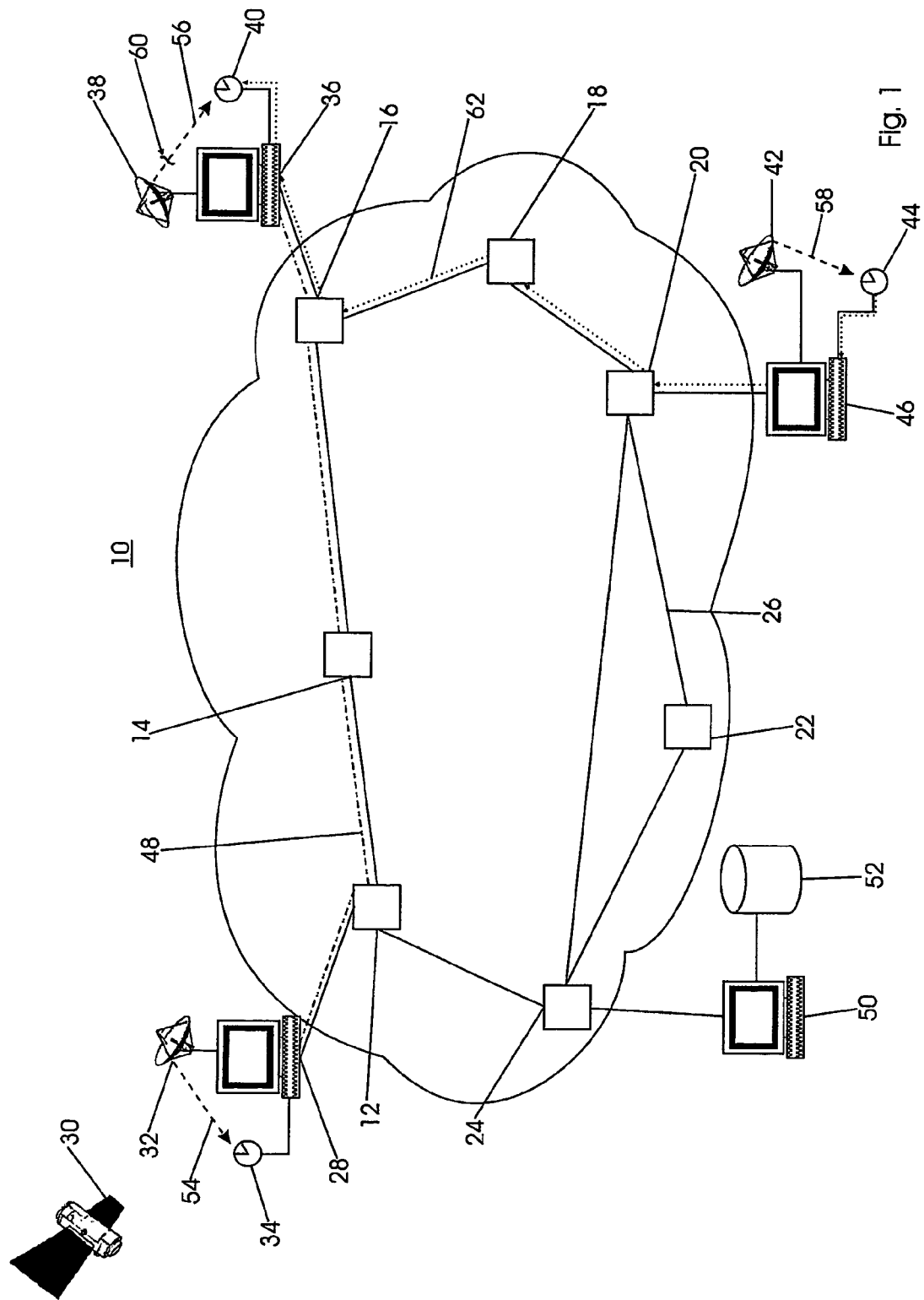
FIG. 1 is a schematic representation of a telecommunications network including a plurality of measuring computers having different time sources for carrying out the method according to the present invention.

FIG. 1 schematically shows a telecommunications network 10 including a plurality of switching devices 12 through 24 interconnected via trunk lines 26. Telecommunications network 10 is, for example, the Internet.

Switching exchange 12 is assigned a first measuring computer 28. To receive signals emitted by a satellite system (GPS) including a plurality of satellites 30, first measuring computer 28 has a GPS antenna 32 and a GPS map for processing the received signals. GPS antenna 32 and the GPS map, which is not explicitly shown, together form the local GPS receiver of first measuring computer 28 required to receive the GPS signals. Moreover, a local clock 34 is incorporated in first measuring computer 28.

A second measuring computer 36 connected to switching device 16 also has a GPS antenna 38 and a local clock 40. The local GPS receiver of second measuring computer 36 required to receive the GPS signals is, in turn, made up of GPS antenna 38 and a GPS map, which is integrated in second measuring computer 36.

Corresponding peripheral devices, namely a GPS antenna 42 and a local clock 44, are associated with a third measuring computer 46 connected to switching device 20. Here too, a GPS map and GPS antenna 42 form a local GPS receiver of third measuring computer 46 required to receive the emitted GPS signals.

Measuring computers 28, 36 and 46 continuously receive UTC time (Universal Coordinated Time) via the local GPS receivers introduced earlier. For the sake of simplicity, the GPS receivers of measuring computers 28, 36, 46 are referred to as GPS clock, as mentioned above.

Trunk lines 26 from first measuring computer 28 via switching devices 12, 14 and 16 to second measuring computer 36 form a measurement path 48, which is shown in the drawing as a double dot-dashed line for the purpose of illustration.

A control computer 50 interacting with a database 52 is assigned to switching device 24. Control computer 50 is used to control measuring computers 28, 36.

To carry out the measurement, a measurement program for measuring the one-way delay is installed in each of measuring computers 28 and 36.

The goal of the measurement system is to determine the packet delay of a measurement packet from first measuring computer 28 via measurement path 48 to second measuring computer 36. Thus, the measurement connection is a unidirectional measurement connection, where separate measurement packets are sent from first measuring computer 28 to measuring computer 36.

The measurement of the one-way delay is carried out according to the following simplified scheme:

A measurement packet is sent from first measuring computer 28 to second measuring computer 36 via measurement path 48, i.e. via trunk line 26, switching exchange 12, switching exchange 14, and switching exchange 16. In the process, the measurement packets are dispatched using the User Datagram Protocol (UDP). UDP is a connectionless Internet transport protocol based on IP. The measurement packets contain, inter alia, time stamps and sequence numbers.

Shortly before first measuring computer 28 sends the first bit of the measurement packet, the so-called "send time stamp" is read out/set. This value of the send time stamp, i.e., the sending time of the measurement packet, is transmitted to second measuring computer 36 together with the measurement packet.

At second measuring computer 36, the arrival of the measurement packet is detected. In the process, a so-called "receive time stamp" is generated shortly after the last bit of the test packet is received at second measuring computer 36.

The measurement result sought, i.e., the one-way delay, corresponds roughly to the difference of the two time stamps, and is stored by control computer 50 in database 52 for later visualization.

In order to minimize the probability of measurement failure caused by the lack of a time stamp, a plurality of different time sources with graded accuracy, which are accessible by measuring computers 28, 26 and 46 for generating the time stamps, are configured as will be explained hereinafter. However, the system always first attempts to read the time stamp from the time source of the highest accuracy.

The already described GPS clocks of measuring computers 28, 36 and 46 are used as the time sources of the highest accuracy. Using the GPS clocks, measuring computers 28, 36 and 46 can generate time stamps with an error of ±0.5 μs.

The time sources of the second highest accuracy available to measuring computers 28, 36 and 46 are their local clocks 34, 40 and 44, which are continuously synchronized via NTP (Network Time Protocol) to the GPS clock or the local GPS receiver for this purpose. The synchronization of local clocks 34, 40 and 44 via NTP to the local GPS receivers of measuring computers 28, 36 and 46 is more simply referred to also as "internal synchronization" here. In the drawing, the internal synchronization of local clock 34 of first measuring computer 28 is symbolized by an arrow 54. At second measuring computer 36, the internal synchronization of local clock 40 to the local GPS receiver of second measuring computer 36 is symbolized by arrow 56, and at third measuring computer 46, the internal synchronization of local clock 44 to the local GPS receiver of third measuring computer 46 is symbolized by arrow 58.

The time sources used as the time sources of the third highest order are local clocks 34, 40 and 44 of measuring computers 28, 36, 46, which are synchronized via NTP to the internally synchronized clock of the other measuring computer 28, 36, 46 for this purpose. In the following, this further synchronization is also referred to as "external synchronization", and will be further explained hereinafter.

For example, at second measuring computer 36, reception of the GPS signals is not possible, for example, due a defective GPS antenna 38. As a consequence, after some time, it is no longer possible to synchronize local clock 40 internally. In the drawing, the failure of the internal synchronization is indicated by reference numeral 60. Then, local clock 40 is externally synchronized via NTP to the internally synchronized local clock 44 of third measuring computer 46, which is shown in the drawing by broken line 62.

The unsynchronized local clocks 34, 40 and 44 of measuring computers 28, 36 and 46 are referred to as time sources of the fourth highest order.

In the present example, first measuring computer 28 reads the send time stamp from the GPS clock, i.e., the clock of the highest accuracy. This send time stamp is written into the measurement packet. Then, the status "time stamp GPS accurate" is stored in a status field.

First measuring computer 28, i.e., the sending measuring computer, and second measuring computer 36, i.e., the receiving measuring computer, each have a separate region available in the status field for their status entries.

If, as in the present example, the GPS clock at second measuring computer 36 fails, no receive time stamp can be read from the time source of the highest accuracy. Therefore, the measurement program reads local clock 40 of second measuring computer 36. In the process, the measurement program detects whether local clock 40 is synchronized, the source to which NTP synchronizes, and the accuracy of the synchronization. Since NTP maintains the status of an internal synchronization for several minutes, the time stamp read is almost as accurate as the time stamp of a GPS clock. If the accuracy read is less than 1 millisecond, the value "NTP synchronized, accurate" is written to the status field. If the accuracy read is less than 2 milliseconds, then the value "NTP synchronized, inaccurate" is written to the status field.

If the GPS clock could not be read for a longer period of time, for example, more than about 5 minutes, then NTP automatically switches to external synchronization. In this mode, the accuracy of the time stamps read is clearly worse than in the case of internal synchronization. Therefore, the system only checks whether the accuracy of NTP is less 2 milliseconds. Then, "NTP synchronized, inaccurate" is written to the status field.

If the GPS clock cannot be read, and the accuracy of NTP is worse than 2 milliseconds, then the time stamp of local clock 40 of second measuring computer 36 is actually written into the measurement packet, but a special value is written to the status field, so that this measurement packet will not be considered in the later evaluation for delay calculation.

Accordingly, the following status field entries are generated as a function of the time source used and the obtained accuracy:

| Synchronization | Status field entry/ time stamp accuracy |
| --- | --- |
| GPS | GPS accurate |
| NTP internal synchr., accuracy < 1 ms | NTP accurate |
| NTP internal synchr., accuracy < 2 ms | NTP inaccurate |
| NTP internal synchr., accuracy > 2 ms | Not synchronized |
| NTP external synchr., accuracy < 2 ms | NTP inaccurate |
| NTP external synchr., accuracy > 2 ms | Not synchronized |
| No synchronization | Not synchronized |

It is a feature of the present invention that it allows a time stamp to be read from a different time source when the GPS clock fails, thus minimizing the probability of a measurement failure due to the lack of a time stamp.

What is claimed is:

1. A method for time synchronization of a plurality of measuring computers cooperating over a telecommunications network, the method comprising:
   providing a plurality of first time sources associated with a first measuring computer, each of the plurality of first time sources having a different respective accuracy and configured to provide a first time stamp;
   selecting, using the first measuring computer, a third time source of the plurality of first time sources as a function of an accuracy of the third time source;
   transmitting measurement packets between the first measuring computer and a second measuring computer of the plurality of measuring computers;
   generating first data associated with the first time stamp, the first time stamp being a send time stamp;
   generating second data associated with a receive time stamp;
   assigning the first data and the second data to a predetermined evaluation; and
   stopping the evaluation of the first data and the second data when a respective quality of the first and second data falls below a predetermined level.

2. The method as recited in claim 1 wherein the telecommunications network includes at least one of an internet and an intranet.

3. The method as recited in claim 1 further comprising performing a measurement method using the first time stamp.

4. The method as recited in claim 1 wherein the third time source is more accurate than at least one other of the plurality of first time sources.

5. The method as recited in claim 1 wherein the third time source has a next best accuracy relative to a fourth time source of the plurality of first time sources, and further comprising attempting, using the first measuring computer, to initially select the fourth time source before the selecting the third time source, the selecting the third time source including automatically selecting the third time source when the fourth time source has failed.

6. The method as recited in claim 1 wherein the third time source includes signals of a satellite system, the third time source being more accurate than any other of the plurality of first time sources.

7. The method as recited in claim 6 wherein the satellite system includes a global positioning system.

8. The method as recited in claim 6 wherein the first measuring computer includes a local global positioning system receiver integrated therein and configured to receive the signals of the satellite system.

9. The method as recited in claim 1 wherein each of the measuring computers includes a respective local clock continuously synchronized to a respective local GPS receiver via a network time protocol so as to provide a respective internally synchronized local clock.

10. The method as recited in claim 9 wherein a fourth of the plurality of first time sources includes signals of a satellite system, and the third time source includes the internally synchronized local clock of the first measuring computer, the third time source having a next highest accuracy relative to the fourth time source.

11. The method as recited in claim 1 wherein the first measuring computer includes a first local global positioning system receiver and first local clock, and further comprising, when no signal of a global positioning system is present at the first local global positioning system receiver, synchronizing the first local clock via a network time protocol to a second local clock of at least one predetermined second measuring computer of the plurality of measuring computers after a predetermined time interval so as to provide an external synchronization.

12. The method as recited in claim 11 wherein the time interval is adjustable.

13. The method as recited in claim 11 wherein the second local clock has a second highest accuracy relative to an accuracy of other time sources of the plurality of first time sources.

14. The method as recited in claim 1 wherein the first measuring computer includes a first local clock and further comprising synchronizing the first local clock via a network time protocol to a second local clock of at least one predetermined second measuring computer of the plurality of measuring computers after a predetermined time interval so as to externally synchronize the first local clock, the plurality of first time sources including the externally synchronized first local clock, the externally synchronized first local clock having a third highest accuracy relative to other time sources of the plurality of first time sources.

15. The method as recited in claim 1 further comprising synchronizing a first local clock of the first measuring computer via a network time protocol and storing a type and an accuracy of the synchronizing.

16. The method as recited in claim 1 wherein the first measuring computer includes a first local clock, the first time source including the first local clock, the first local clock being unsynchronized, the unsynchronized first local clock having a fourth highest accuracy relative to other time sources of the plurality of first time sources.

17. The method as recited in claim 1 wherein the measurement packets include user datagram protocol packets.

18. The method as recited in claim 1 wherein the first measuring computer acts as a sender and the second measuring computer acts as a receiver.

19. The method as recited in claim 1 further comprising, using the first measuring computer:
   recording the first time stamp, the first time stamp being a send time stamp of an outgoing measurement packet; and
   transmitting the first data to the second measuring computer with an outgoing measurement packet.

20. The method as recited in claim 19 wherein the first data relates to information about at least one of the third time source, a type of synchronization, an accuracy of the synchronization, and an accuracy of the send time stamp.

21. The method as recited in claim 19 further comprising generating, with the second measuring computer, the receive time stamp, the receive time stamp being a time stamp of an incoming measurement packet.

22. The method as recited in claim 21 wherein the data associated with the receive time stamp relates to information about at least one of the third time source, a type of synchronization, an accuracy of the synchronization, and an accuracy of the receive time stamp.

23. The method as recited in claim 1 further comprising transmitting a sequence number to the second measuring computer with an outgoing measurement packet.

24. The method as recited in claim 1 further comprising:
    determining a measurement result from the first and second data.

25. The method as recited in claim 1 further comprising providing a plurality of second time sources associated with a second measuring computer of the plurality of measuring computers, each of the second time sources having a different respective accuracy and configured to provide a second time stamp.

26. A time synchronization device comprising:
    a first measuring computer;
    a second measuring computer cooperating with the first measuring computer over a telecommunications network;
    the first measuring computer configured at least to generate first data associated with a second time stamp and the first data to the second measuring computer over the telecommunication network;
    the second measuring computer configured at least to receive a transmission over the telecommunication network, and to generate second data associated with a receive time stamp;
    each of the first measuring computer and the second measuring computer further configured to stop an evaluation of the first and second data when a respective quality of the first data and the second data falls below a predetermined level; and
    a plurality of first time sources associated with a first measuring computer, each of the plurality of first time sources having a different respective accuracy and configured to provide a first time stamp;
    wherein the first computer is further configured to select a third time source of the plurality of first time sources as a function of an accuracy of the third time source.

27. The time synchronization device as recited in claim 26 further comprising a plurality of second time sources associated with the second measuring computer, each of the second time sources having a different respective accuracy and configured to provide a second time stamp.

28. The time synchronization device as recited in claim 27 wherein the third time source includes signals of a satellite system, the third time source being more accurate than any other of the plurality of first time sources.

29. The time synchronization device as recited in claim 28 wherein the satellite system includes a global positioning system.

30. The time synchronization device as recited in claim 26 wherein the telecommunications network includes at least one of an internet and an intranet.

31. The time synchronization device as recited in claim 26 wherein the first time stamp is usable for performing a measurement method.

32. The time synchronization device as recited in claim 26 wherein the third time source is more accurate than at least one other of the plurality of first time sources.

33. The time synchronization device as recited in claim 26 wherein:
    the third time source has a next best accuracy relative to a fourth time source of the plurality of first time sources; and
    the first measuring computer is configured to initially attempt to select the fourth time source before selecting the third time source, and then to automatically select the third time source when the fourth time source has failed.

* * * * *